(12) United States Patent
Kurokawa et al.

(10) Patent No.: US 12,043,308 B2
(45) Date of Patent: Jul. 23, 2024

(54) VEHICLE CONTROL SYSTEM

(71) Applicant: Mazda Motor Corporation, Hiroshima (JP)

(72) Inventors: Yoshimasa Kurokawa, Hiroshima (JP); Tetsuhiro Yamashita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 263 days.

(21) Appl. No.: 17/630,915

(22) PCT Filed: Jul. 20, 2020

(86) PCT No.: PCT/JP2020/028015
§ 371 (c)(1),
(2) Date: Jan. 28, 2022

(87) PCT Pub. No.: WO2021/020191
PCT Pub. Date: Feb. 4, 2021

(65) Prior Publication Data
US 2022/0266906 A1    Aug. 25, 2022

(30) Foreign Application Priority Data
Jul. 30, 2019    (JP) .................. 2019-140264

(51) Int. Cl.
*B60W 10/20*    (2006.01)
*B60W 50/10*    (2012.01)
(Continued)

(52) U.S. Cl.
CPC ......... *B62D 15/0235* (2013.01); *B60W 50/10* (2013.01); *G07C 5/0808* (2013.01);
(Continued)

(58) Field of Classification Search
CPC ....... B60W 2510/18; B60W 2510/182; B60W 2510/184; B60W 2510/20;
(Continued)

(56) References Cited

U.S. PATENT DOCUMENTS

2006/0015231 A1    1/2006  Yoshimura et al.
2010/0030421 A1    2/2010  Yoshimura et al.
(Continued)

FOREIGN PATENT DOCUMENTS

EP          1616746 A2      1/2006
JP        2003-291692 A    10/2003
(Continued)

OTHER PUBLICATIONS

English translation of JP 2003-291692 (Year: 2003).*
(Continued)

*Primary Examiner* — Erick R Solis
(74) *Attorney, Agent, or Firm* — XSENSUS LLP (57) ABSTRACT

A vehicle control system includes a central ECU configured to calculate target outputs of actuators, and relay devices each disposed in a communication path between the central ECU and a corresponding actuator among the actuators. The relay devices include a specific relay device capable of communicating with a specific actuator related to driving control, braking control, or steering control of a vehicle. The specific relay device among the relay devices includes a specific abnormality diagnosis unit configured to diagnose an abnormality in the specific relay device, and a backup calculation unit capable of calculating a control amount of the specific actuator coupled to the specific relay device. A relay device other than the specific relay device among the relay devices does not have a self-diagnosis function.

11 Claims, 5 Drawing Sheets

(51) Int. Cl.
  *B62D 15/02* (2006.01)
  *G07C 5/08* (2006.01)
(52) U.S. Cl.
  CPC . *B60W 2510/182* (2013.01); *B60W 2510/184* (2013.01); *B60W 2510/20* (2013.01); *B60W 2510/202* (2013.01); *B60W 2510/205* (2013.01); *B60W 2510/207* (2013.01)
(58) Field of Classification Search
  CPC ..... B60W 2510/202; B60W 2510/205; B60W 2510/207
  USPC ............................ 701/39, 43, 62, 76, 92, 97
  See application file for complete search history.

(56) References Cited

U.S. PATENT DOCUMENTS

| | | | |
|---|---|---|---|
| 2014/0188343 A1 | 7/2014 | Yoshimura et al. | |
| 2014/0351658 A1 | 11/2014 | D'Ambrosio | |
| 2014/0358375 A1* | 12/2014 | Sakai | B62D 5/049 701/1 |
| 2015/0100207 A1 | 4/2015 | Yoshimura et al. | |
| 2017/0151979 A1* | 6/2017 | Maeda | B62D 5/0481 |
| 2018/0339724 A1* | 11/2018 | Nishikawa | H02M 7/5395 |
| 2019/0100237 A1* | 4/2019 | Klesing | B62D 5/0493 |
| 2019/0241207 A1* | 8/2019 | Jeong | B62D 15/021 |
| 2019/0363664 A1* | 11/2019 | Nakamura | H02P 27/06 |
| 2020/0055542 A1* | 2/2020 | Yamamoto | H02P 27/06 |
| 2022/0166365 A1* | 5/2022 | Nakamura | H02P 29/024 |

FOREIGN PATENT DOCUMENTS

| | | |
|---|---|---|
| JP | 2010-143458 A | 7/2010 |
| JP | 2016-196295 A | 11/2016 |

OTHER PUBLICATIONS

English translation of JP 2016-196295 (Year: 2016).*
International Search Report and Written Opinion mailed on Oct. 6, 2020, received for PCT Application PCT/JP2020/028015, Filed on Jul. 20, 2020, 9 pages including English Translation.

* cited by examiner

VEHICLE CONTROL SYSTEM

CROSS-REFERENCE TO RELATED APPLICATIONS

The present application is based on PCT/JP2020/028015 filed on Jul. 20, 2020, and claims priority to Japanese Application No. 2019-140264 filed on Jul. 30, 2019, the entire contents of each are incorporated herein by reference.

TECHNICAL FIELD

The technology disclosed herein belongs to a technical field related to a vehicle control system.

BACKGROUND ART

In recent years, electrification of in-vehicle devices has been markedly progressing, and motion of a vehicle has come to be controlled through electronic control.

For example, PTL 1 discloses a vehicle control system including a command controller and actuator drive controllers. The command controller calculates an operation amount command value for an in-vehicle device. Each of the actuator drive controllers controls an actuator, based on the operation amount command value given from the command controller. Each of the command controller and the actuator drive controllers has a failure detection function.

According to PTL 1, when the command controller has an abnormality, each actuator drive controller controls the corresponding actuator.

CITATION LIST

Patent Literature

PTL 1: Japanese Unexamined Patent Application Publication No. 2016-196295

SUMMARY OF INVENTION

Technical Problem

From the viewpoint of improving the fail-operational capability in vehicle control, all the actuator drive controllers may have the failure detection function as in PTL 1. However, in recent years, the use of electronic control for in-vehicle devices related to fundamental actions (driving, braking, and steering) of a vehicle, such as a steering device and a braking device, has been markedly progressing, and the number of control-target actuators reaches several hundreds. If all the controllers of the respective actuators have the failure detection function, the number of man-hours for system construction increases, leading to an increase in development cost.

In addition, according to PTL 1, when an abnormality occurs in the command controller, all the actuator drive controllers need to be kept in an operating state, leading to an increase in power consumption.

The technology disclosed herein has been made in view of such points, and an object thereof is to suppress an increase in cost as much as possible while implementing a high fail-operational capability.

Solution to Problem

To solve the problems described above, the technology disclosed herein is directed to a vehicle control system that includes a plurality of sensors; a central control device configured to calculate target outputs of a plurality of actuators, based on outputs of the respective sensors; and a plurality of relay devices each disposed in a communication path between the central control device and a corresponding actuator among the actuators and configured to relay a control signal generated by the central control device, in which the actuators include a specific actuator related to driving control, braking control, or steering control of a vehicle; the plurality of relay devices include a specific relay device capable of communicating with the specific actuator; the central control device includes a central abnormality diagnosis unit configured to diagnose an abnormality in the central control device; the specific relay device among the plurality of relay devices includes a specific abnormality diagnosis unit configured to diagnose an abnormality in the specific relay device, and a backup calculation unit capable of calculating a target output of the specific actuator coupled to the specific relay device; and a relay device other than the specific relay device among the plurality of relay devices does not have a self-diagnosis function.

According to this configuration, the central control device calculates the target output of each actuator. Thus, if an abnormality occurs in the central control device, each actuator may fail to operate normally. Therefore, when an abnormality occurs in the central control device, it is necessary to guide a vehicle to a neighboring shoulder of a road or a neighboring parking lot. To guide the vehicle to the shoulder of a road or the like, at least a specific actuator related to driving control, braking control, or steering control of the vehicle just needs to be controllable. According to the configuration described above, the specific relay device capable of communicating with the specific actuator includes the backup calculation unit. Thus, even if the central control device has an abnormality, the target output of the specific actuator can be calculated by the backup calculation unit and the vehicle can be guided to the shoulder of a road or the like. By configuring the specific relay device to be capable of detecting an abnormality therein, the occurrence of an abnormality also in the specific relay device can be suppressed when an abnormality occurs in the central control device. As a result, redundancy as the entire system can be implemented, and thus a high fail-operational capability can be implemented.

On the other hand, for an actuator not related to driving control, braking control, and steering control of the vehicle, either an operating state or a non-operating state just needs to be selectable when the central control device has an abnormality. Thus, complex control does not needed. For this reason, even if such a relay device does not have a function of diagnosing an abnormality therein, no particular problem is caused from the viewpoint of the fail-operational capability. Therefore, as in the configuration described above, the relay device other than the specific relay device is configured so as not to have the function of diagnosing an abnormality therein. Thus, the manufacturing cost of the relay device can be reduced.

Consequently, an increase in cost can be suppressed as much as possible while implementing a high fail-operational capability.

In the vehicle control system, the specific relay device may be configured to receive an output of at least one sensor among the sensors, and in response to the central abnormality diagnosis unit detecting an abnormality in the central control device, the backup calculation unit of the specific relay device may control the specific actuator, based on information obtained by the sensor and input to the specific relay device.

According to this configuration, the accuracy of the target output calculated by the specific relay device can be improved. Thus, the fail-operational capability can be improved.

In the vehicle control system, the specific relay device may include a communication diagnosis unit configured to diagnose an abnormality in a state of communication between the specific relay device and the central control device, and in response to the communication diagnosis unit detecting an abnormality in the state of communication between the specific relay device and the central control device, the backup calculation unit of the specific relay device may control the specific actuator, based on information obtained by the sensor and input to the specific relay device.

That is, when an abnormality occurs in the state of communication between the central control device and the specific relay device because of disconnection of a communication line between the central control device and the specific relay device or the like, the specific relay device needs to calculate the target output of the specific actuator regardless of whether the central control device is normal or abnormal. According to the configuration described above, when an abnormality occurs in the state of communication between the central control device and the specific relay device, the specific relay device calculates the target output of the specific actuator by using the backup calculation unit. As a result, the fail-operational capability can be improved further.

In the vehicle control system equipped with the communication diagnosis unit, the specific relay device may include an actuator control device configured to control the specific actuator, and a communication hub device configured to receive a signal from the central control device and transmit the signal to the actuator control device, the communication hub device may include the communication diagnosis unit of the specific relay device, and the communication diagnosis unit may be configured to further diagnose an abnormality in a state of communication between the communication hub device and the actuator control device.

According to this configuration, which part of the communication path from the central control device to the specific actuator where the abnormality in communication has occurred can be grasped by the communication diagnosis unit. Thus, the ease-of-maintenance can be improved.

In the vehicle control system in which the specific relay device includes the actuator control device and the communication hub device, the actuator control device may include the backup calculation unit, and in response to the communication diagnosis unit detecting an abnormality in the state of communication between the communication hub device and the actuator control device, the specific relay device may control the specific actuator by using the actuator control device.

According to this configuration, since the specific actuator can be controlled at a location in an end portion of the communication path, the fail-operational capability can be improved further.

In the vehicle control system, the specific actuator may include an electric motor for an electric power steering device.

Specifically, control of electric power steering requires continuous control of a steering direction, a steering angle, and so on. Thus, the redundancy needs to be particularly increased from the viewpoint of improving the fail-operational capability. Therefore, according to this configuration, an advantageous effect of a high fail-operational capability can be more appropriately exhibited.

Advantageous Effects of Invention

As described above, according to the technology disclosed herein, a high fail-operational capability can be implemented by providing, in the specific relay device, the specific abnormality diagnosis unit that diagnoses an abnormality in the specific relay device and the backup calculation unit capable of calculating a target output of the specific actuator coupled to the specific relay device. In addition, an increase in cost can be suppressed as much as possible by configuring the relay device other than the specific relay device so as not to have the function of diagnosing an abnormality therein. Therefore, an increase in cost can be suppressed as much as possible while implementing a high fail-operational capability.

DESCRIPTION OF EMBODIMENTS

An exemplary embodiment will be described in detail below with reference to the drawings.

Figure 1:
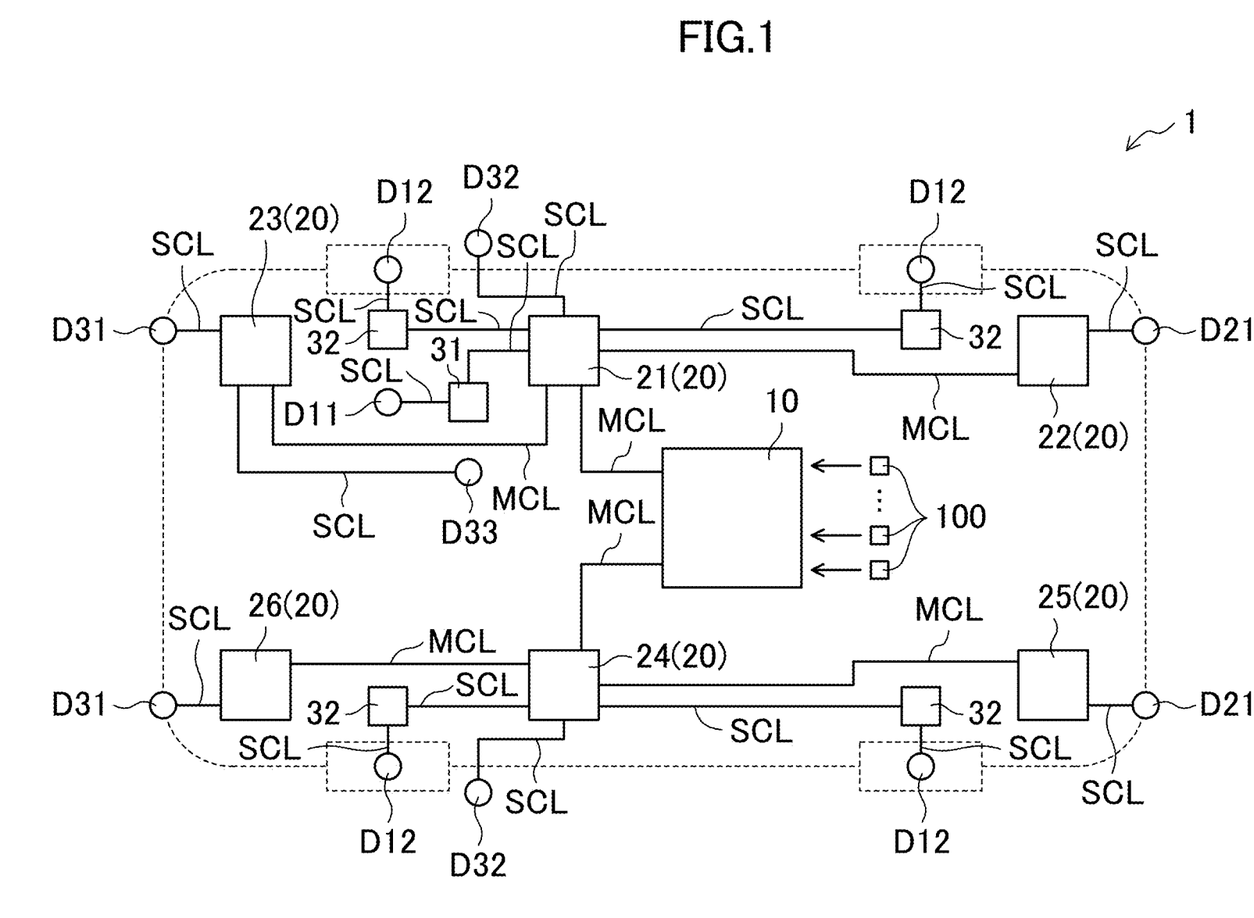
FIG. 1 is a schematic diagram illustrating part of a communication path in a vehicle equipped with a vehicle control system according to an exemplary embodiment.

FIG. 1 schematically illustrates a configuration of a communication path in a vehicle 1 equipped with a vehicle control system according to the present embodiment. This vehicle 1 is an automobile capable of performing assist driving in which the automobile travels while assisting a driver in operations and autonomous driving in which the automobile travels without operations of the driver as well as manual driving in which the automobile travels in accordance with operations of the driver. This vehicle 1 employs a by-wire system for performing electrical control, in driving control, braking control, and steering control. That is, in the vehicle 1, an operation on an accelerator pedal, an operation on a brake pedal, and an operation on a steering wheel are detected by respective sensors. In accordance with a control signal based on an output of each of the sensors, a corresponding actuator responsible for control is controlled.

As illustrated in FIG. 1, the vehicle 1 includes a plurality of actuators for causing various in-vehicle devices mounted in the vehicle 1 to operate. The in-vehicle devices include so-called body-related devices that are not related to driving, braking, and steering, which are fundamental actions of the vehicle 1. The actuators illustrated in FIG. 1 are an example of actuators mounted in the vehicle 1. The vehicle 1 may include an actuator other than the actuators illustrated in FIG. 1.

In the present embodiment, the actuators for in-vehicle devices are mainly classified into three types. A first type refers to actuators that are related to fundamental actions of the vehicle 1 and for which continuous control is to be continued even in case of emergency. A second type refers to actuators that are not related to the fundamental actions of the vehicle 1 and for which whether or not to operate is to be selected in accordance with a state of the vehicle 1 in case of emergency. A third type refers to actuators that are not related to the fundamental actions of the vehicle 1 and are just required to continue either an operating state or a non-operating state in case of emergency.

Hereinafter, the actuators of the first type are referred to as fundamental actuators, the actuators of the second type are referred to as selective actuators, and the actuators of the third type are referred to as fixed actuators.

Examples of the fundamental actuators include an electric motor D11 for an electric power steering device (EPS device), a brake actuator D12 for an electric braking device, and actuators for a throttle valve and a fuel injection valve of an engine. Examples of the selective actuators include an actuator D21 for a brake lamp, and so on. Examples of the fixed actuators include an actuator D31 for a headlight, an electric motor D32 for an electric mirror, an audio apparatus D33, and so on. In the description below, when the actuators are distinguished from one another, the actuators are identified by the names of in-vehicle devices driven by the respective actuators, such as the EPS device D11 and the headlight D31. Note that the fundamental actuators such as the EPS device D11 and the braking device D12 are an example of specific actuators.

To control operations of various actuators, the vehicle 1 includes a central ECU 10 ((Electric Control Unit) that serves as a central control device, and a plurality of (six in FIG. 1) zone ECUs 20 configured to be capable of communicating with the central ECU 10.

Figure 2:
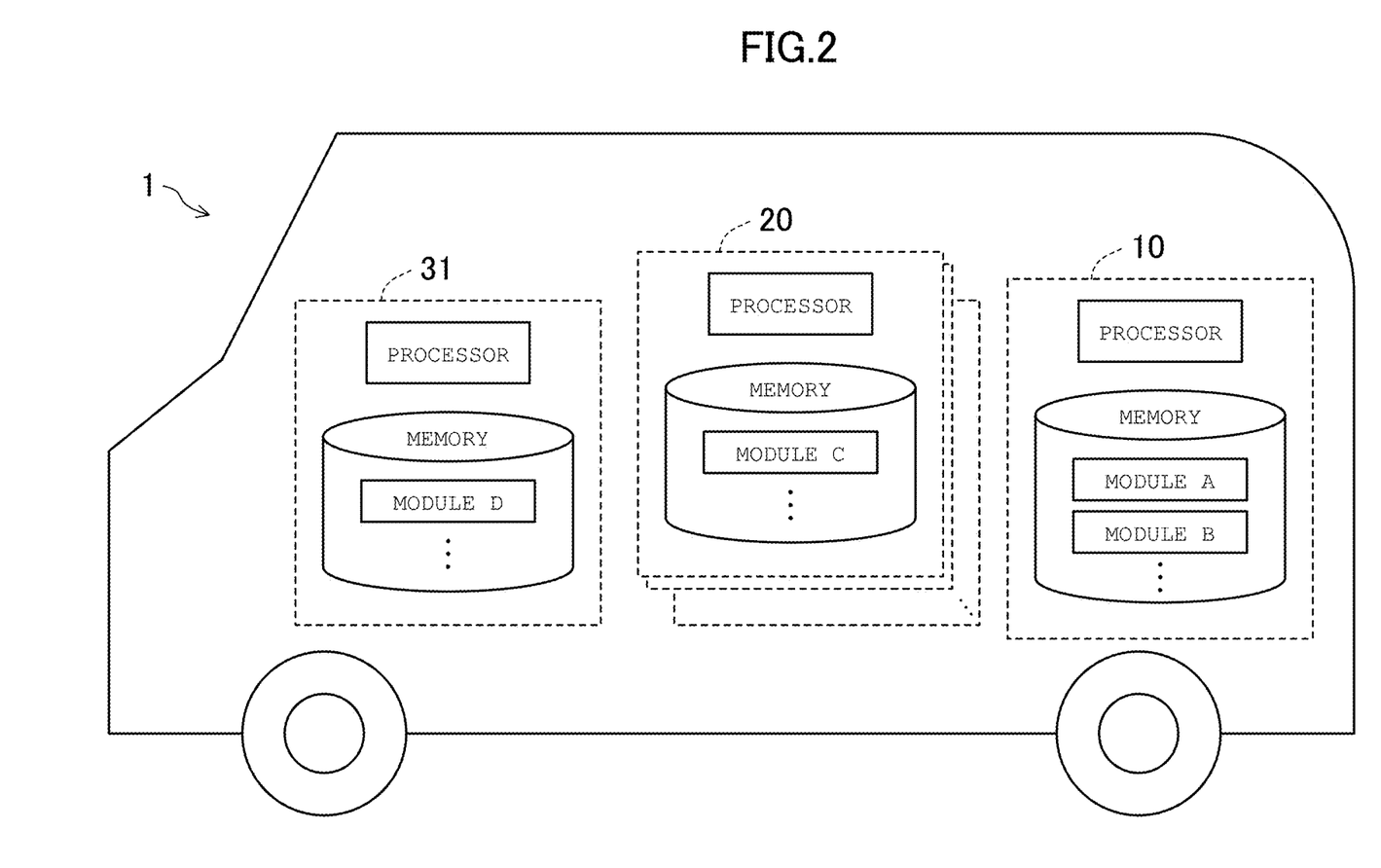
FIG. 2 is a schematic diagram illustrating the vehicle equipped with the vehicle control system.

As illustrated in FIG. 2, each of the central ECU 10 and the zone ECUs 20 is computer hardware, and specifically, includes a processor including a CPU, a memory that stores a plurality of modules, and the like.

The central ECU 10 generates a control signal for controlling each actuator that causes an in-vehicle device mounted in the vehicle 1 to operate. In the vehicle 1, a control signal of each actuator is generated by the central ECU 10, and is transferred to the actuator via the zone ECU 20 and so on as a rule.

As illustrated in FIGS. 1 to 5, signals from a plurality of sensors 100 mounted in the vehicle 1 are input to the central ECU 10. The plurality of sensors 100 include, for example, a plurality of cameras 101 that are disposed at a body or the like of the vehicle and images an environment outside the vehicle; a plurality of radars 102 that are disposed at the body or the like of the vehicle and detects an object located outside the vehicle; a location sensor 103 that detects a location of the vehicle (vehicle location information) by using the global positioning system (GPS); occupant state sensors 104 each of which obtains a state of an occupant including whether the occupant is present in the vehicle; a brake pedal sensor 106 that obtains an amount by which the brake pedal is pressed by a driver of the vehicle; a steering angle sensor 105 that obtains a steering angle of the steering operated by the driver of the vehicle; and an accelerator pedal position sensor 107 that obtains an amount by which the accelerator pedal is pressed by the driver of the vehicle. The sensors 100 also include switches such as a switch of the headlights D31 and a switch of the audio apparatus D33. The sensors 101 to 107 illustrated herein are an example of sensors that input information to the central ECU 10. The present embodiment does not exclude the case where information is input to the central ECU 10 from a sensor other than the sensors 101 to 107.

The cameras 101 are arranged so that an area around the vehicle are imaged by 360 degrees in the horizontal direction. Each of the cameras 101 captures an optical image representing an environment outside the vehicle and generates image data. Each of the cameras 101 outputs the generated image data to the central ECU 10.

Similarly to the cameras 101, the radars 102 are arranged so that a detection range extends around the vehicle by 360 degrees in the horizontal direction. The type of the radars 102 is not particularly limited. For example, millimeter wave radars or infrared radars can be employed.

The occupant state sensors 104 are constituted by, for example, a vehicle-cabin camera that images the inside of the vehicle cabin and load sensors each disposed in a seat cushion. The occupant state sensors 104 output the generated image data and detection results to the central ECU 10.

The central ECU 10 is, for example, a processor constituted by one or a plurality of chips. The central ECU 10 may have an AI (Artificial Intelligence) function.

When the vehicle 1 is performing manual driving or assist driving, the central ECU 10 calculates a driving force, a braking force, and a steering angle to be output by the respective actuators, based on detection values respectively obtained the accelerator pedal position sensor 107, the brake pedal sensor 106, the steering angle sensor 105, etc. The central ECU 10 generates target signals indicating the calculated driving force, braking force, and steering angle, that is, target states of the driving force, braking force, and steering angle to be achieved by the respective actuators. In particular, when the vehicle 1 is performing assist driving, the central ECU 10 takes into account target motion of the vehicle 1 described later, in calculation of the driving force, the braking force, and the steering angle.

To enable the vehicle 1 to perform autonomous driving or assist driving, the central ECU 10 receives information from the plurality of sensors 101 to 107 and calculates a route along which the vehicle 1 is to travel. The central ECU 10 determines the motion of the vehicle 1 for following the calculated route.

The central ECU 10 receives information from the plurality of sensors 101 to 107 and infers the environment outside the vehicle 1. The environment outside the vehicle refers to, for example, the presence or absence of an object, a road condition, and ambient brightness. The central ECU 10 integrates information such as a relative distance to the object obtained by the radars 102, with images of the outside of the vehicle captured by the cameras 101 and a recognition result of the object so as to create a 3D map representing the environment outside the vehicle.

Based on the created 3D map, the central ECU 10 creates a 2D map for use in calculation of a travel route of the vehicle 1. Based on the created 2D map, the central ECU 10 generates a travel route of the vehicle 1. The central ECU 10 determines target motion of the vehicle for following the generated travel route, and calculates a driving force, a braking force, and a steering angle for implementing the determined target motion. The central ECU 10 generates target signals indicating the calculated driving force, braking force, and steering angle, that is, target states of the driving force, braking force, and steering angle to be achieved by the respective actuators.

Based on the inferred environment outside the vehicle and the calculated travel route, the central ECU 10 generates control signals for the actuators of the body-related devices that are not related to driving control, braking control, and steering control of the vehicle 1. For example, when it is inferred that the surrounding area is dark, the central ECU 10 generates a control signal to be transmitted to the headlights D31 so as to turn on the headlights.

Based on information obtained by the occupant state sensors 104, the central ECU 10 infers a state of an occupant in the vehicle cabin by using a trained model generated through deep learning. The state of an occupant means a health condition or emotion of the occupant. Examples of the health condition of the occupant include being healthy, being a little tired, being in bad shape, and being less conscious. Examples of the emotion of the occupant include being fun, being OK, getting bored, being annoyed, and being uncomfortable. The central ECU 10 generates various control signals in consideration of the health condition of the occupant and the emotion of the occupant as well. For example, when the central ECU 10 infers that the temperature in the vehicle cabin is high and the occupant does not feel well, the central ECU 10 causes an air-conditioner to operate or causes a window to open.

Figure 3:
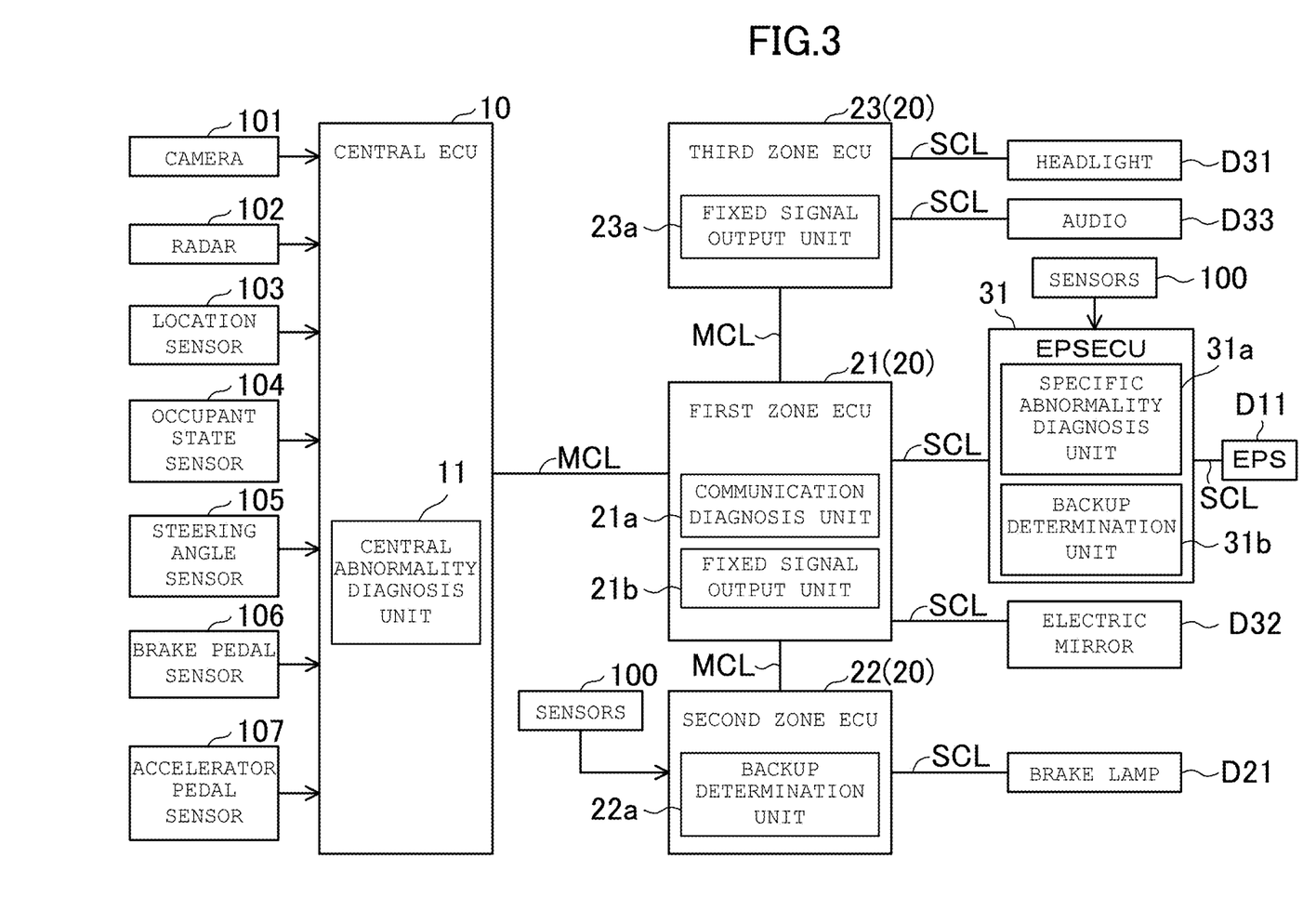
FIG. 3 is a block diagram illustrating a configuration of a central ECU and zone ECUs on a driver's seat side.
Figure 4:
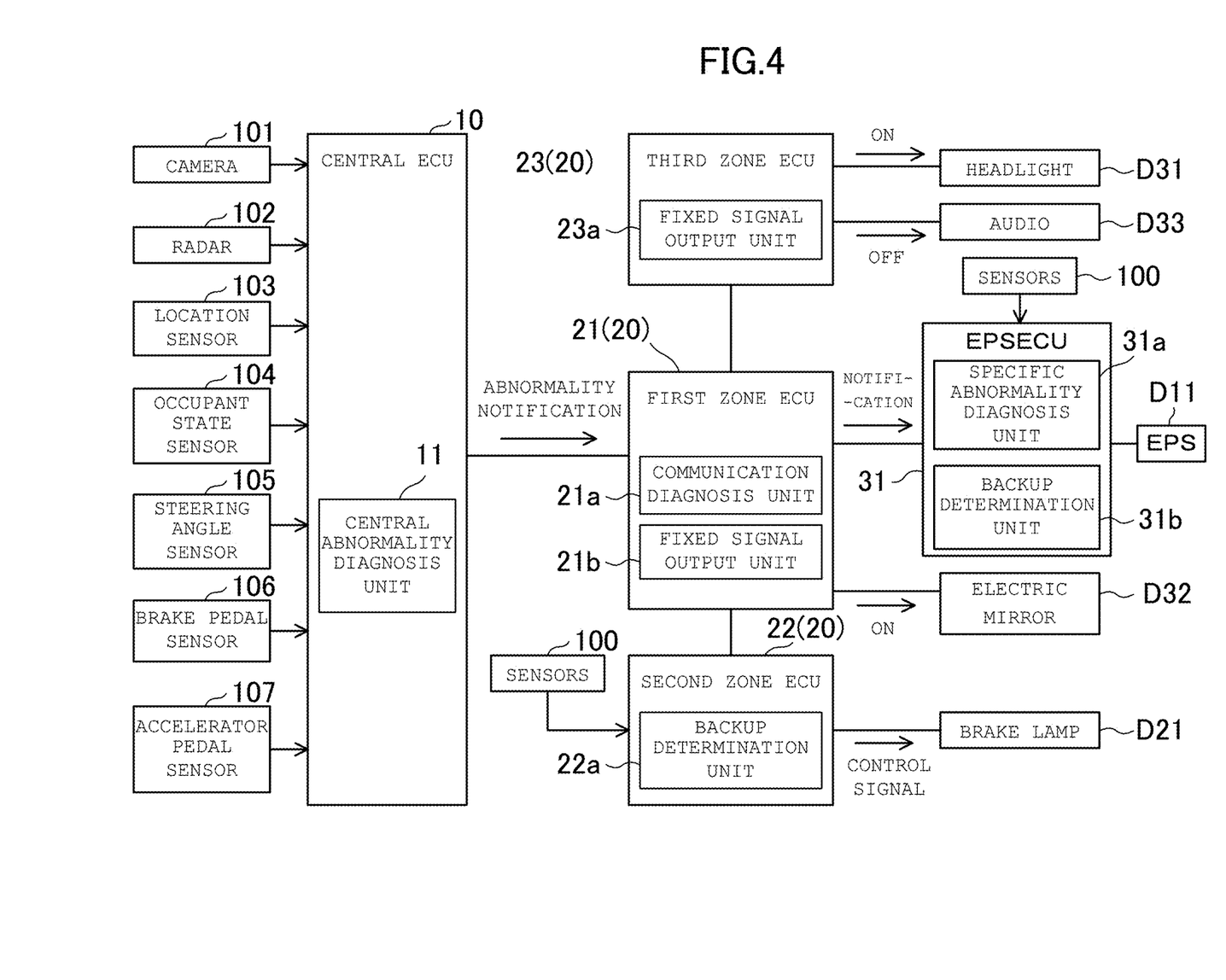
FIG. 4 is a block diagram illustrating control performed by the zone ECUs and an EPS ECU when the central ECU has an abnormality.

As illustrated in FIGS. 3 and 4, the central ECU 10 includes a central abnormality diagnosis unit 11 that diagnoses an abnormality in the central ECU 10. The central abnormality diagnosis unit 11 diagnoses an abnormality in the central ECU 10 through a BIST (Built-In Self Test). The central ECU 10 notifies the zone ECUs 20 (in this case, a first zone ECU 21 and a fourth zone ECU 24 described later) of a diagnosis result obtained by the central abnormality diagnosis unit 11. The central abnormality diagnosis unit 11 is an example of the modules stored in the memory of the central ECU 10.

The zone ECU 20 is located in a communication path between the central ECU 10 and each actuator in each predetermined zone of the vehicle 1. Each zone ECU 20 constitutes a relay device that relays a control signal generated by the central ECU 10. In the present embodiment, the zone ECU 20 disposed in a right central portion of the vehicle may be referred to as the first zone ECU 21, the zone ECU 20 disposed in a right rear portion of the vehicle may be referred to as a second zone ECU 22, the zone ECU 20 disposed in a right front portion of the vehicle may be referred to as a third zone ECU 23, the zone ECU 20 disposed in a left central portion of the vehicle may referred to as the fourth zone ECU 24, the zone ECU 20 disposed in a left rear portion of the vehicle may be referred to as a fifth zone ECU 25, and the zone ECU 20 disposed in a left front portion of the vehicle may be referred to as a sixth zone ECU 26. The zones may be determined in any manner. If the number of zones increases or decreases, the number of zone ECUs 20 increases or decreases accordingly.

As illustrated in FIG. 1, the first zone ECU 21 is coupled to the central ECU 10 by a communication line MCL and is also coupled to the second zone ECU 22 and the third zone ECU 23 by communication lines MCL. The fourth zone ECU 24 is coupled to the central ECU 10 by a communication line MCL and is also coupled to the fifth zone ECU 25 and the sixth zone ECU 26 by communication lines MCL. That is, the first zone ECU 21 is configured to be capable of communicating with the second zone ECU 22 and the third zone ECU 23 via the communication lines MCL. On the other hand, the fourth zone ECU 24 is configured to be capable of communicating with the fifth zone ECU 25 and the sixth zone ECU 26 via the communication lines MCL. The communication lines MCL that couple the central ECU 10 and the zone ECUs 20 to each other and the communication lines MCL that couple the zone ECUs 20 to each other are constituted by, for example, ETHERNET (registered trademark) communication cables.

On the other hand, each zone ECU 20 and corresponding actuators are coupled by using communication lines SCL. The communication lines SCL are constituted by, for example, CAN communication cables. Although an illustration is omitted, each zone ECU 20 has a function of performing protocol conversion from ETHERNET (registered trademark) to CAN.

Configurations of the zone ECUs 20 will be described next. The configurations of the first zone ECU 21 to the third zone ECU 23 will now be described in detail with reference to FIG. 3.

As illustrated in FIG. 3, the first zone ECU 21 is coupled to, for example, the EPS device D11, the braking device D12 for the right front wheel, the braking device D12 for the right rear wheel, and the electric mirror D32 on the right side by using the communication lines SCL. That is, the first zone ECU 21 constitutes a specific relay device capable of communicating with the EPS device D11 and the braking device D12 that are specific actuators. In FIG. 3, illustrations of the braking devices D12 are omitted. Although illustrations of other actuators are omitted in FIG. 3, the first zone ECU 21 may also be coupled to other selective actuators or other fixed actuators.

An EPS ECU 31 that controls the EPS device D11, based on a control signal (target signal) relayed by the first zone ECU 21 is provided in a communication path between the first zone ECU 21 and the EPS device D11. The first zone ECU 21 transfers information transmitted from the central ECU 10, to the EPS ECU 31 without any processing. That is, the first zone ECU 21 constitutes a communication hub device of the specific relay device. As described above, since the zone ECU 20 performs protocol conversion on the control signal transmitted from the central ECU 10, the control signal itself changes. The EPS ECU 31 will be described later.

The first zone ECU 21 is directly coupled to the electric mirror D32 by the communication line SCL. The first zone ECU 21 transfers the information for the electric mirror D32 transmitted from the central ECU 10, to the electric mirror D32 without any processing. That is, the electric mirror D32 operates based on a control signal that is transmitted from the central ECU 10 and relayed by the first zone ECU 21 as a rule.

The first zone ECU 21 includes a communication diagnosis unit 21a that diagnoses an abnormality in a state of communication between the first zone ECU 21 and the central ECU 10. The communication diagnosis unit 21a transmits a first test signal for communication diagnosis to the central ECU 10. The central ECU 10 that has received the first test signal from the communication diagnosis unit 21a returns, to the communication diagnosis unit 21a, a second test signal indicating that the central ECU 10 has received the first test signal. In response to successfully receiving the second test signal from the central ECU 10, the communication diagnosis unit 21a determines that the state of communication between the central ECU 10 and the first zone ECU 21 is normal. On the other hand, in response to failing to receive the second test signal from the central ECU 10, the communication diagnosis unit 21a determines that there is an abnormality in the state of communication between the central ECU 10 and the first zone ECU 21. If there is an abnormality in the state of communication between the first zone ECU 21 and the central ECU 10, the communication diagnosis unit 21a notifies the second zone ECU 22 and the third zone ECU 23 of the abnormality in the state of communication. For example, when the ignition of the vehicle 1 is switched on, the communication diagnosis unit 21*a* diagnoses an abnormality in the state of communication between the first zone ECU 21 and the central ECU 10. The abnormality in the state of communication is, for example, disconnection of the communication line MCL.

The communication diagnosis unit 21*a* also diagnoses an abnormality in a state of communication between the first zone ECU 21 and the EPS ECU 31. The communication diagnosis unit 21*a* diagnoses the state of communication between the first zone ECU 21 and the EPS ECU 31 by using a method similar to that used for the diagnosis of the state of communication between the first zone ECU 21 and the central ECU 10. In response to the communication diagnosis unit 21*a* detecting an abnormality in the state of communication between the first zone ECU 21 and the EPS ECU 31, the first zone ECU 21 notifies the central ECU 10 of the abnormality. In response to receiving the notification from the first zone ECU 21, the central ECU 10 reports the abnormality in the state of communication between the first zone ECU 21 and the EPS ECU 31 to the occupant. Examples of the reporting method include a method such as sounding a buzzer or providing a lamp that reports a communication abnormality of an electronic device on a meter panel and causing the lamp to blink. For example, when the ignition of the vehicle 1 is switched on or when the vehicle 1 is stationary for a long time, the communication diagnosis unit 21*a* diagnoses an abnormality in the state of communication between the first zone ECU 21 and the EPS ECU 31.

The first zone ECU 21 includes a fixed signal output unit 21*b* capable of outputting an ON signal for keeping the electric mirror in a fully open state. When the central ECU 10 is normal and the state of communication from the central ECU 10 to the first zone ECU 21 is normal, the fixed signal output unit 21*b* does not output the ON signal to the electric mirror D32. On the other hand, when there is an abnormality in the central ECU 10 or there is an abnormality in the state of communication from the central ECU 10 to the first zone ECU 21, the fixed signal output unit 21*b* outputs the ON signal to the electric mirror D32. Thus, when there is an abnormality in the central ECU 10 or there is an abnormality in the state of communication between the central ECU 10 and the first zone ECU 21, the electric mirror is kept in the fully open state.

Similarly to the central ECU 10 and the zone ECUs 20, as illustrated in FIG. 2, the EPS ECU 31 is computer hardware, and specifically, includes a processor including a CPU, a memory that stores a plurality of modules, and the like.

Based on information on a target steering angle transferred from the central ECU 10, the EPS ECU 31 calculates a control amount of the EPS device D11 (such as an amount of current to be supplied to the electric motor) so that the EPS device D11 achieves the target steering angle. The EPS ECU 31 outputs a signal based on the calculated control amount to the EPS device D11. Thus, the EPS ECU 31 constitutes a specific relay device that relays a control signal generated by the central ECU 10. In particular, the EPS ECU 31 corresponds to an actuator control device of the specific relay device.

The EPS ECU 31 is configured to be capable of obtaining information from at least one sensor among the plurality of sensors 100. In the present embodiment, the EPS ECU 31 is configured to be capable of obtaining an output of at least the steering angle sensor 105.

The EPS ECU 31 includes a specific abnormality diagnosis unit 31*a* that diagnoses an abnormality in the EPS ECU 31. In particular, the specific abnormality diagnosis unit 31*a* diagnoses an abnormality in a backup calculation unit 31*b* described later. The specific abnormality diagnosis unit 31*a* diagnoses an abnormality in the EPS ECU 31 through the BIST, for example. The EPS ECU 31 notifies the first zone ECU 21 of a diagnosis result obtained by the specific abnormality diagnosis unit 31*a*. The first zone ECU 21 notifies the central ECU 10 of the result which the first zone ECU 21 is notified of by the EPS ECU 31. The specific abnormality diagnosis unit 31*a* and the backup calculation unit 31*b* are an example of the modules stored in the memory of the EPS ECU 31.

The EPS ECU 31 includes the backup calculation unit 31*b* capable of calculating a target steering angle for the EPS device D11, based on outputs of the sensors 100. When the central ECU 10 is normal and the state of communication from the central ECU 10 to the EPS ECU 31 is normal, the backup calculation unit 31*b* does not calculate the target steering angle for the EPS device D11. On the other hand, when there is an abnormality in the central ECU 10 or there is an abnormality in the state of communication from the central ECU 10 to the EPS ECU 31, the backup calculation unit 31*b* calculates the target steering angle for the EPS device D11. The backup calculation unit 31*b* calculates the target steering angle for the EPS device D11, based on information obtained by the sensor and input to the EPS ECU 31. The backup calculation unit 31*b* transmits a signal based on the calculated target steering angle to the EPS device D11.

Unlike the central ECU 10, the backup calculation unit 31*b* does not perform control according to the environment outside the vehicle 1. The backup calculation unit 31*b* performs control of the EPS device D11 based only on an operation performed by the occupant of the vehicle 1.

Although an illustration is omitted in FIG. 3, a brake ECU 32 (see FIG. 1) that controls the braking device D12, based on a control signal (target signal) relayed by the first zone ECU 21 is provided in the communication path between the first zone ECU 21 and the braking device D12. Similarly to the EPS ECU 31, the brake ECU 32 includes a backup calculation unit and a specific abnormality diagnosis unit that diagnoses an abnormality in the backup calculation unit. This brake ECU 32 also constitutes an actuator control device of the specific relay device.

As illustrated in FIG. 3, the second zone ECU 22 is coupled to, for example, the brake lamp D21 on the right side by the communication line SCL. The second zone ECU 22 is configured to be capable of obtaining information from at least one sensor among the plurality of sensors 100. In the present embodiment, the second zone ECU 22 is configured to be capable of obtaining an output of at least the brake pedal sensor 106. Although illustrations of other actuators are omitted, the second zone ECU 22 is not coupled to the fundamental actuators but is coupled to the selective actuators and the fixed actuators.

The second zone ECU 22 is directly coupled to the brake lamp D21 by the communication line SCL. The second zone ECU 22 transfers the information for the brake lamp D21 transmitted from the central ECU 10, to the brake lamp D21 without any processing. That is, the brake lamp D21 operates based on a control signal that is transmitted from the central ECU 10 and relayed by the second zone ECU 22 as a rule.

The second zone ECU 22 includes a backup determination unit 22*a* capable of determining whether to cause the brake lamp D21 to operate. When the central ECU 10 is normal and the state of communication from the central ECU 10 to the second zone ECU 22 is normal, the backup determination unit 22a does not make determination as to whether to cause the brake lamp D21 to operate. On the other hand, when there is an abnormality in the central ECU 10 or there is an abnormality in the state of communication from the central ECU 10 to the second zone ECU 22, the backup determination unit 22a determines whether to cause the brake lamp D21 to operate. The backup determination unit 22a determines whether to cause the brake lamp D21 to operate, based on information obtained by the sensor and input to the second zone ECU 22. The backup determination unit 22a transmits a control signal for causing the brake lamp D21 to operate, to the brake lamp D21. In accordance with the notification from the first zone ECU 21, the second zone ECU 22 recognizes an abnormality in the central ECU 10 and an abnormality in the state of communication between the central ECU 10 and the first zone ECU 21.

The second zone ECU 22 does not have a function of diagnosing an abnormality in the second zone ECU 22.

As illustrated in FIG. 3, the third zone ECU 23 is coupled to, for example, the headlight D31 on the right side by the communication line SCL. In the present embodiment, the outputs from the sensors are not input to the third zone ECU 23. Although illustrations of the other actuators are omitted, the third zone ECU 23 is coupled neither to the fundamental actuators nor to the selective actuators but is coupled only to the fixed actuators.

The third zone ECU 23 is directly coupled to the headlight D31 by the communication line SCL. The third zone ECU 23 transfers the information for the headlight D31 transmitted from the central ECU 10, to the headlight D31 without any processing. That is, the headlight D31 operates based on a control signal that is transmitted from the central ECU 10 and relayed by the third zone ECU 23 as a rule.

The third zone ECU 23 includes a fixed signal output unit 23a capable of outputting an ON signal for keeping the headlight in a light-ON state. When the central ECU 10 is normal and the state of communication from the central ECU 10 to the third zone ECU 23 is normal, the fixed signal output unit 23a does not output the ON signal to the headlight D31. On the other hand, when there is an abnormality in the central ECU 10 or there is an abnormality in the state of communication from the central ECU 10 to the third zone ECU 23, the fixed signal output unit 23a outputs the ON signal to the headlight D31. Thus, when there is an abnormality in the central ECU 10 or there is an abnormality in the state of communication between the central ECU 10 and the third zone ECU 23, the headlight D31 is kept in the light-ON state.

The fixed signal output unit 23a is configured to be capable of outputting an OFF signal for keeping the audio apparatus D33 in an OFF state. When the central ECU 10 is normal and the state of communication from the central ECU 10 to the third zone ECU 23 is normal, the fixed signal output unit 23a does not output the OFF signal to the audio apparatus D33. On the other hand, when there is an abnormality in the central ECU 10 or there is an abnormality in the state of communication from the central ECU 10 to the third zone ECU 23, the fixed signal output unit 23a outputs the OFF signal to the audio apparatus D33. Thus, when there is an abnormality in the central ECU 10 or there is an abnormality in the state of communication between the central ECU 10 and the third zone ECU 23, the audio apparatus D33 is kept in the OFF state.

The third zone ECU 23 does not have a function of diagnosing an abnormality in the third zone ECU 23.

The fourth zone ECU 24 to the sixth zone ECU 26 are also configured according to substantially the same design methods as those of the first zone ECU 21 to the third zone ECU 23, respectively. That is, the zone ECU 20, such as the fourth zone ECU 24, to which the fundamental actuators (the braking device D12 in this case) are coupled includes the communication diagnosis unit 21a as in the first zone ECU 21. The zone ECU 20, such as the fifth zone ECU 25, to which no fundamental actuator is coupled but the selective actuators (the brake lamp D21 in this case) are coupled includes the backup determination unit 22a as in the second zone ECU 22. The zone ECU 20, such as the sixth zone ECU 26, to which only the fixed actuators (the headlight D31 in this case) are coupled includes the fixed signal output unit 23a as in the third zone ECU 23.

The communication diagnosis unit 21a and the fixed signal output unit 21b are an example of the modules stored in the memory of the first zone ECU 21 and the memory of the fourth zone ECU 24. The backup determination unit 22a is an example of the modules stored in the memory of the second zone ECU 22 and the memory of the fifth zone ECU 25. The fixed signal output unit 23a is an example of the modules stored in the memory of the third zone ECU 23 and the memory of the sixth zone ECU 26.

In the present embodiment, the central ECU 10 calculates the target output of each actuator. Thus, when an abnormality occurs in the central ECU 10, each actuator may fail to operate normally. Therefore, when an abnormality occurs in the central ECU 10, it is necessary to guide the vehicle 1 to a neighboring shoulder of a road or a neighboring parking lot. To guide the vehicle 1 to the shoulder of a road or the like, at least the fundamental actuators of the vehicle 1 just need to be controllable. Accordingly, in the present embodiment, the backup calculation unit 31b is provided in the ECU capable of communicating with the fundamental actuators to make the fundamental actuators controllable even when an abnormality occurs in the central ECU 10.

FIG. 4 illustrates signals transmitted from the first to third zone ECUs 21 to 23 when the central abnormality diagnosis unit 11 detects an abnormality in the central ECU 10. As in FIG. 3, illustrations of the braking device D12 and the brake ECU 32 are omitted also in FIG. 4.

When the central abnormality diagnosis unit 11 detects an abnormality in the central ECU 10, the central abnormality diagnosis unit 11 outputs an abnormality notification for notifying the first zone ECU 21 of the abnormality in the central ECU 10. The first zone ECU 21 that has received the abnormality notification notifies the second zone ECU 22 and the third zone ECU 23 that the first zone ECU 21 has received the abnormality notification. The first zone ECU 21 to the third zone ECU 23 do not transfer, to the respective actuators, the signals from the central ECU 10.

The first zone ECU 21 then notifies the EPS ECU 31 that an abnormality has occurred in the central ECU 10.

The EPS ECU 31 that has received the notification from the first zone ECU 21 calculates, with the backup calculation unit 31b, a control amount of the EPS device D11, based on the information obtained by the sensor and input to the EPS ECU 31. The EPS ECU 31 controls the EPS device D11 in accordance with the control amount calculated by the backup calculation unit 31b.

The first zone ECU 21 also outputs, with the fixed signal output unit 21b, the ON signal to the electric mirror D32 to keep the electric mirror in the fully open state.

Based on at least one of information obtained by the sensor and input to the second zone ECU 22 and information input from the other zone ECU 20, the second zone ECU 22 determines, with the backup determination unit 22a, whether to cause the brake lamp D21 to operate. The backup determination unit 22a transmits a control signal for causing the brake lamp D21 to operate, to the brake lamp D21.

The third zone ECU 23 outputs, with the fixed signal output unit 23a, the ON signal to the headlight D31 to keep the headlight in the light-ON state. The third zone ECU 23 also outputs, with the fixed signal output unit 23a, the OFF signal to the audio apparatus D33 to keep the audio apparatus D33 in the OFF state.

As described above, by changing the configuration of the relay device in accordance with the type of the actuator coupled to the relay device, the number of man-hours for system construction can be suppressed and thus development cost can be suppressed while implementing the fail-operational capability of the control system. That is, if an ECU having the backup calculation unit 31b, such as the EPS ECU 31, is provided in all the relay devices, the development cost increases. For this reason, the calculation function such as the backup calculation unit 31b is desirably omitted for the relay devices (the third zone ECU 23 and sixth zone ECU 26 in this example) to which only the actuators, such as the headlight D31, that are not related to the fundamental actions of the vehicle 1 and are controllable only with the ON/OFF signals are coupled. On the other hand, if all the relay devices include only the fixed signal output unit 23a as in the third zone ECU 23, the EPS device D11 can no longer be continuously controlled and consequently the fail-operational capability of the control system decreases. Thus, with the configuration according to the present embodiment, the development cost can be suppressed while implementing the fail-operational capability of the control system.

In the present embodiment, the relay devices that are not coupled to the fundamental actuators, such as the second zone ECU 22 and the third zone ECU 23, do not have a self-diagnosis function. That is, for the selective actuators and the fixed actuators, either the operating state or the non-operating state just needs to be selectable when the central ECU 10 has an abnormality. Thus, complex control is not required. Therefore, even if the relay devices such as the second zone ECU 22 and the third zone ECU 23 do not have a function of diagnosing an abnormality therein, no particular problem is caused from the viewpoint of the fail-operational capability. For this reason, the relay devices such as the second zone ECU 22 and the third zone ECU 23 are configured so as not to have the function of diagnosing an abnormality therein. Thus, the manufacturing cost of the zone ECUs 20 can be reduced.

Accordingly, in the present embodiment, the vehicle control system includes the plurality of sensors 100; the central ECU 10 configured to calculate target outputs of a plurality of actuators, based on outputs of the respective sensors 100; and the plurality of relay devices (for example, the zone ECUs 20, the EPS ECU 31, and the brake ECU 32) each disposed in a communication path between the central ECU 10 and a corresponding actuator among the actuators and configured to relay a control signal generated by the central ECU, in which the actuators include a fundamental actuator (for example, the EPS device D11 or the braking device D12) related to driving control, braking control, or steering control of the vehicle 1; the plurality of relay devices include a specific relay device (for example, the first zone ECU 21, the EPS ECU 31, or the brake ECU 32) capable of communicating with the fundamental actuator; the central ECU 10 includes a central abnormality diagnosis unit 11 configured to diagnose an abnormality in the central ECU 10; the specific relay device among the plurality of relay devices includes the specific abnormality diagnosis unit 31a configured to diagnose an abnormality in the specific relay device, and a backup calculation unit 31b capable of calculating a target output of the fundamental actuator coupled to the specific relay device; a relay device (for example, the second zone ECU 22 or the third zone ECU 23) other than the specific relay device among the plurality of relay devices does not have a self-diagnosis function. Thus, even if an abnormality occurs in the central ECU 10, the target output of the fundamental actuator can be calculated by the backup calculation unit 31b and the vehicle 1 can be guided to the shoulder of a road or the like. By configuring the specific abnormality diagnosis unit 31a to be capable of detecting an abnormality in the specific relay device, the occurrence of an abnormality also in the specific relay device can be suppressed when an abnormality occurs in the central ECU 10. As a result, redundancy as the entire system can be implemented, and thus a high fail-operational capability can be implemented. On the other hand, relay devices coupled only to at least one of the selective actuator and the fixed actuator that do not require complex control do not have a function of diagnosing an abnormality therein. Thus, the manufacturing cost of the relay device can be reduced.

In the present embodiment, the specific relay device is configured to receive an output of at least one sensor among the sensors 100, and in response to the central abnormality diagnosis unit 11 detecting an abnormality in the central ECU 10, the backup calculation unit 31b of the specific relay device controls the fundamental actuator, based on information obtained by the sensor 100 and input to the specific relay device. Thus, the accuracy of the control amount of the fundamental actuator calculated by the specific relay device can be improved. As a result, the fail-operational capability can be improved.

In the present embodiment, the specific relay device includes the communication diagnosis unit 21a configured to diagnose an abnormality in a state of communication between the specific relay device and the central ECU 10, and in response to the communication diagnosis unit 21a detecting an abnormality in the state of communication between the specific relay device and the central ECU 10, the backup calculation unit 31b of the specific relay device controls the fundamental actuator, based on information obtained by the sensor 100 and input to the specific relay device. That is, when an abnormality occurs in the state of communication between the central ECU 10 and the specific relay device because of disconnection of a communication line between the central ECU 10 and the specific relay device or the like, the specific relay device needs to calculate a target output of the fundamental actuator regardless of whether the central ECU 10 is normal or abnormal. Thus, with the configuration described above, the fail-operational capability can be improved further.

In addition, in the present embodiment, the specific relay device includes an actuator control device (for example, the EPS ECU 31) configured to control the fundamental actuator, and a communication hub device (for example, the first zone ECU 21) configured to receive a signal from the central ECU 10 and transmit the signal to the actuator control device, the communication hub device includes the communication diagnosis unit 21a of the specific relay device, and the communication diagnosis unit 21a is configured to further diagnose an abnormality in a state of communication between the communication hub device and the actuator control device. Therefore, which part of the communication path from the central ECU 10 to the fundamental actuator where the abnormality in communication has occurred can be grasped. Thus, the ease-of-maintenance can be improved.

In addition, in the present embodiment, the actuator control device includes the backup calculation unit 31$b$, and in response to the communication diagnosis unit 21$a$ detecting an abnormality in the state of communication between the communication hub device and the actuator control device, the specific relay device controls the fundamental actuator by using the actuator control device. According to this configuration, since the fundamental actuator can be controlled at a location in an end portion of the communication path, the fail-operational capability can be improved further.

Figure 5:
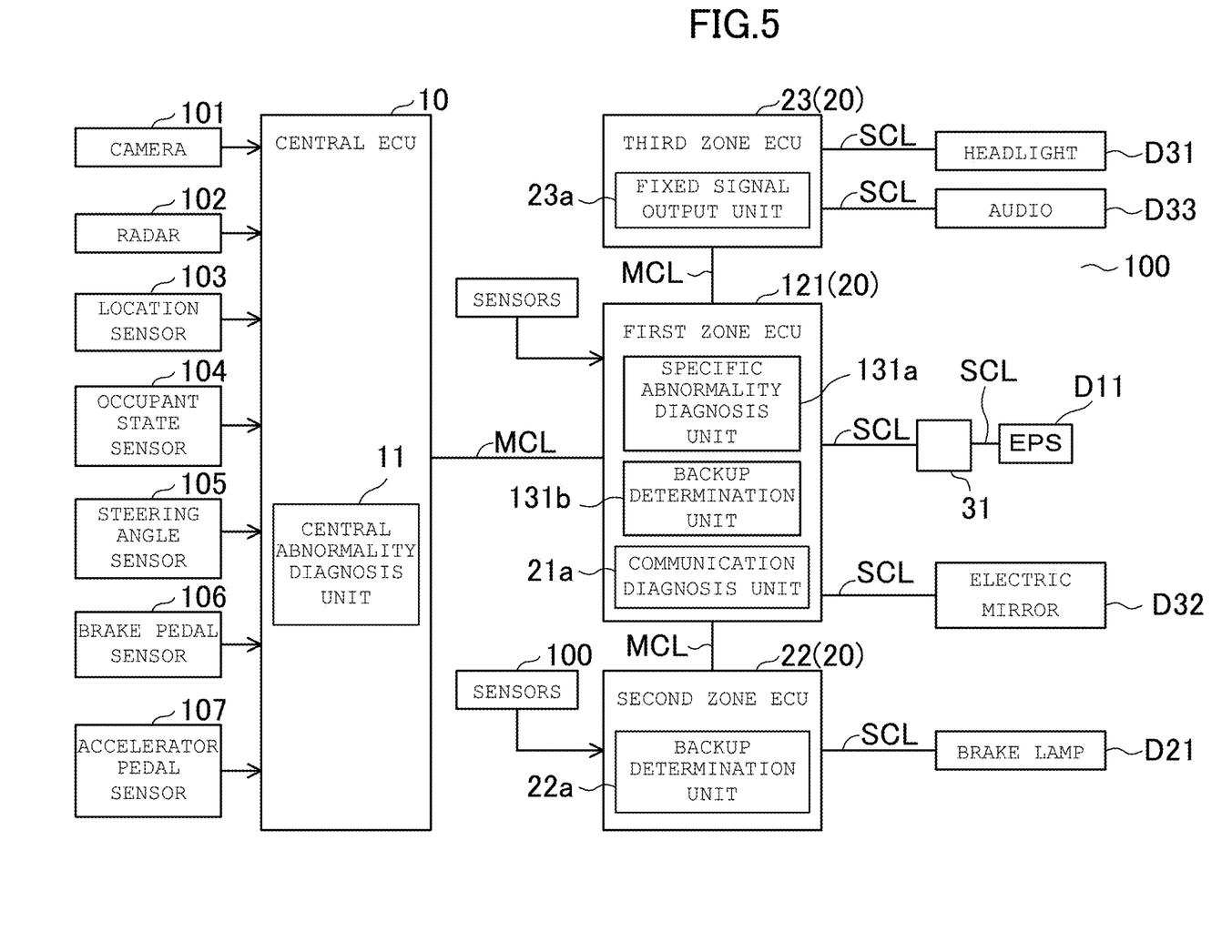
FIG. 5 is a block diagram illustrating a modification of the embodiment.

FIG. 5 illustrates a modification of the present embodiment. In this modification, a first zone ECU 121 includes a specific abnormality diagnosis unit 131$a$ and a backup calculation unit 131$b$. In this modification, the first zone ECU 121 does not include the fixed signal output unit 21$b$. When there is an abnormality in the central ECU 10 or there is an abnormality in a state of communication from the central ECU 10 to the first zone ECU 121, the backup calculation unit 131$b$ outputs an ON signal to the electric mirror D32. The first zone ECU 121 is also configured to be capable of obtaining an output of at least one sensor among the sensors 100. The specific abnormality diagnosis unit 131$a$ and the backup calculation unit 131$b$ are an example of modules stored in the memory of the first zone ECU 121.

In this configuration, in response to occurrence of an abnormality in the central ECU 10, the backup calculation unit 131$b$ of the first zone ECU 121 calculates control amounts of the fundamental actuators (the EPS device D11 and the braking device D12) coupled to the first zone ECU 121. Thus, even if an abnormality occurs in the central ECU 10, the fundamental actuators can be controlled to some extent. Therefore, even with this configuration, a high fail-operational capability can be implemented.

The technology disclosed herein is not limited to the embodiment described above and may be altered within a scope not departing from the gist of the claims.

For example, in the embodiment described above, the zone ECUs (the first zone ECU 21 to the third zone ECU 23) on the driver's seat side and the zone ECUs (the fourth zone ECU 24 to the sixth zone ECU 26) on the passenger's seat side are coupled to one another only through the central ECU 10. However, the configuration is not limited this. For example, the second zone ECU 22 and the fifth zone ECU 25 may be coupled to each other by a communication line and the third zone ECU 23 and the sixth zone ECU 26 may be coupled to each other by a communication line, so that a loop communication network may be formed. According to this configuration, it becomes easier for each zone ECU 20 to obtain information from the central ECU 10 and information from the other zone ECUs 20. Thus, the redundancy of the control system can be improved, and consequently the fail-operational capability can be improved.

As in the modification of the embodiment described above, when the backup calculation unit 131$b$ of the zone ECU 20 is provided, the backup calculation unit 131$b$ transmits a control signal to the fixed actuator such as the electric mirror D32. However, the configuration is not limited to this. The specific zone ECU coupled to the fixed actuator may include the fixed signal output unit, and the fixed signal output unit may output a signal to the fixed actuator coupled to the specific zone ECU.

In the embodiment described above, only the specific zone ECUs (the first zone ECU 21 and the fourth zone ECU 24) include the communication diagnosis unit 21$a$. However, the configuration is not limited to this, and each zone ECU 20 may include the communication diagnosis unit 21$a$.

In the embodiment described above, a vehicle capable of performing autonomous driving is set as the target vehicle. However, the target vehicle need not be the vehicle capable of performing autonomous driving.

The embodiment described above is merely an example and is not to be construed as limiting the scope of the present disclosure. The scope of the present disclosure is defined by the claims, and all modifications and alterations within a scope of the equivalents of the claims are within the scope of the present disclosure.

INDUSTRIAL APPLICABILITY

The technology disclosed herein is useful for improving the fail-operational capability of a vehicle control system.

REFERENCE SIGNS LIST

10 central ECU (central control device)
11 central abnormality diagnosis unit
20 zone ECU
21 first zone ECU (specific relay device, communication hub device)
21$a$ communication diagnosis unit
22 second zone ECU (relay device other than specific relay device)
23 third zone ECU (relay device other than specific relay device)
31 EPS ECU (specific relay device, actuator control device)
31$a$ specific abnormality diagnosis unit
31$b$ backup calculation unit
32 brake ECU (specific relay device, actuator control device)
D11 electric motor (specific actuator) for EPS device
D12 brake actuator (specific actuator) for braking device

The invention claimed is:

1. A vehicle control system comprising:
a plurality of sensors;
a central control device configured to infer an environment outside a vehicle and calculate a target travel route of the vehicle based on outputs of the sensors, and calculate target outputs of a plurality of actuators based on the environment outside the vehicle that was inferred and the target travel route of the vehicle that was calculated; and
a plurality of relay devices each disposed in a communication path between the central control device and a corresponding actuator among the actuators and configured to relay a control signal generated by the central control device to the corresponding actuator, wherein
the actuators include a first specific actuator related to driving control, braking control, or steering control of the vehicle, and a second specific actuator unrelated to driving control, braking control or steering control of the vehicle,
the plurality of relay devices includes a first specific relay device configured to communicate with the first specific actuator, and a second specific relay device configured to communicate only with the second specific actuator,
the central control device is further configured to generate a control signal for each of the first specific actuator and the second specific actuator based on the environment outside the vehicle that was inferred and the target travel route of the vehicle that was calculated, the central control device is further configured to diagnose an abnormality in the central control device, the first specific relay device is further configured to
- diagnose an abnormality in the first specific relay device,
- calculate a target output of the first specific actuator coupled to the first specific relay device,
- receive an output of at least one of the sensors, and
- control the first specific actuator based on the output of the at least one of the sensors and the target output of the first specific actuator that was calculated, in response to the central control device detecting the abnormality in the central control device, and the second specific relay device is further configured to output a preset control signal to turn on or off the second specific actuator in response to the central control device detecting the abnormality in the central control device, the second specific relay device being not configured to diagnose an abnormality in the second specific relay device.

2. The vehicle control system according to claim 1, wherein the first specific relay device is further configured to
- diagnose an abnormality in a state of communication between the first specific relay device and the central control device, and
- control the first specific actuator based on the output of the at least one of the sensors in response to detecting the abnormality in the state of communication between the first specific relay device and the central control device.

3. The vehicle control system according to claim 2, wherein the first specific relay device includes
- an actuator control device configured to control the first specific actuator, and
- a communication hub device configured to receive a signal from the central control device and transmit the signal to the actuator control device, and diagnose an abnormality in a state of communication between the communication hub device and the actuator control device.

4. The vehicle control system according to claim 3, wherein in response to the communication hub device detecting the abnormality in the state of communication between the communication hub device and the actuator control device, the first specific relay device is further configured to control the first specific actuator by using the actuator control device.

5. The vehicle control system according to claim 1, wherein the first specific actuator includes an electric motor for an electric power steering device.

6. The vehicle control system according to claim 2, wherein the first specific actuator includes an electric motor for an electric power steering device.

7. The vehicle control system according to claim 3, wherein the first specific actuator includes an electric motor for an electric power steering device.

8. The vehicle control system according to claim 1, wherein the central control device is further configured to notify the first specific relay device of the abnormality in the central control device when the central control device detects the abnormality in the central control device.

9. The vehicle control system according to claim 8, wherein the first specific relay device is further configured to notify the second specific relay device of the abnormality in the central control device when the first specific relay device is notified of the abnormality in the central control device.

10. The vehicle control system according to claim 1, wherein the first specific relay device is further configured to notify the central control device of the abnormality in the first specific relay device when the first specific relay device detects the abnormality in the first specific relay device.

11. The vehicle control system according to claim 2, wherein the first specific relay device is further configured to notify the second specific relay device of the abnormality in the state of communication between the first specific relay device and the central control device when the first specific relay device detects the abnormality in the state of communication between the first specific relay device and the central control device.

* * * * *